E. M. BOYNTON.
SAW.

No. 175,330. Patented March 28, 1876.

Witnesses:
Donn Twitchell
Will H. Dodge

Inventor:
E. M. Boynton
By his attys.
Dodge & Son

UNITED STATES PATENT OFFICE.

EBEN MOODY BOYNTON, OF WEST NEWBURY, MASSACHUSETTS.

IMPROVEMENT IN SAWS.

Specification forming part of Letters Patent No. 175,330, dated March 28, 1876; application filed January 31, 1876.

*To all whom it may concern:*

Be it known that I, EBEN MOODY BOYNTON, of West Newbury, in the county of Essex and State of Massachusetts, have invented certain Improvements in Saws, of which the following is a specification:

This invention consists in a saw having teeth of an inverted-M form, with the two points of each tooth dressed to cut in line, and the outer cutting-edges formed at a slight inclination outward from the points, as hereinafter fully described and explained.

The invention is intended as an improvement on the saw for which Letters Patent were granted to Alfred Boynton, November 27, 1866, and reissued to me July 27, 1869; and the improvement consists in giving the outer cutting-edges of the teeth a slight inclination from a vertical line outward or forward from the points, in order to facilitate the escape of the sawdust from the arches or spaces between the teeth, give a wider space for filing, and increase the efficiency of the saw in resinous woods.

In the patent above referred to the outer cutting-edges of the teeth were either made vertical or inclined inward from the points, the consequence of which was that, when operating in resinous and green woods, the sawdust would accumulate and be retained in the arches or spaces between the teeth, seriously impeding the action of the saw, and greatly increasing the power required to operate it.

In my present saw I retain the teeth having their two points dressed to cut in line, as in the patent, but give their outer cutting-edges an inclination from the points forward in the direction in which the saw moves when the point is cutting, thereby decreasing the width of the teeth toward their ends, and rendering the arches or spaces between the teeth of increasing width toward the edge of the saw.

Figure 1:
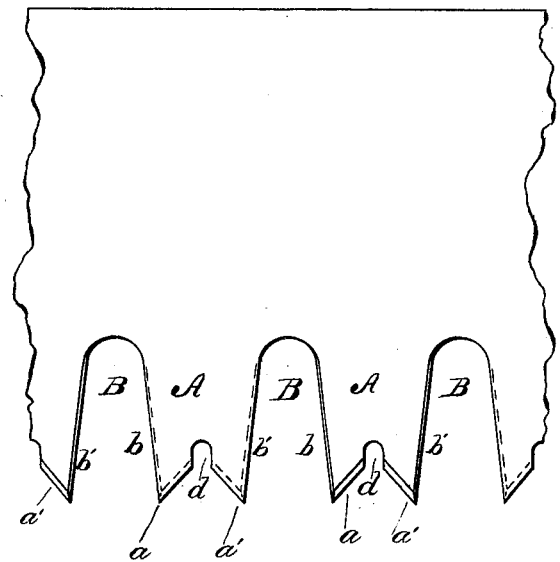
Figure 2:

In the drawings, Figure 1 represents a side or face view of my improved saw; Fig. 2, an edge view of the same.

A represents the teeth, each made of an inverted-M form, with two cutting-points, a and a', both dressed or beveled on the same side, so as to cut in line with each other. B represents the arches or spaces between the teeth. The teeth are each made of slightly-decreasing width toward the lower end, as shown, whereby the arches or spaces B between the teeth are made of increasing width from their upper toward their lower ends, and the outer cutting-edges b b' of the teeth given a slight inclination outward from the cutting-points a a', each edge being inclined upward and forward in the direction in which it moves when cutting.

By combining the features of the teeth having the inclined edges, as shown, with the two points dressed to cut in line, I produce a saw which cuts with ease and rapidity in resinous, wet, and green woods, and which will, under no circumstances, become clogged with the sawdust.

The action of the saw is somewhat improved by the formation of a notch or gullet, d, in the middle of each tooth, between the two points, as shown; but as these notches or arches are not material, the saw may be made with or without them, as preferred. The notches or gullets prevent the fracture of the blade between the points, reduce the labor of filing the teeth, and give a better clearance.

Having thus described my invention, what I claim is—

1. A saw provided with teeth A A, each having two points, a a', dressed to cut in line, and two outer cutting-edges, b b', inclined slightly outward from the points, as and for the purpose shown and described.

2. The saw provided with teeth A, each having two points, a a', dressed to cut in line, a notch or gullet, d, between said points, and two outer cutting-edges, b b', inclining slightly outward from said points, as shown and described.

EBEN MOODY BOYNTON.

Witnesses:
P. T. DODGE,
W. C. DODGE.